United States Patent
Toba (10) Patent No.: US 10,787,132 B2
(45) Date of Patent: Sep. 29, 2020

(54) CEILING MATERIAL FOR VEHICLE

(71) Applicant: Howa Co., Ltd., Kasugai-shi, Aichi-ken (JP)

(72) Inventor: Satoshi Toba, Kasugai (JP)

(73) Assignee: HOWA CO., LTD. (JP)

( * ) Notice: Subject to any disclaimer, the term of this patent is extended or adjusted under 35 U.S.C. 154(b) by 7 days.

(21) Appl. No.: 16/288,832

(22) Filed: Feb. 28, 2019

(65) Prior Publication Data

US 2019/0389399 A1 Dec. 26, 2019

(30) Foreign Application Priority Data

Jun. 25, 2018 (JP) ................................ 2018-119721

(51) Int. Cl.
*B60R 13/02* (2006.01)

(52) U.S. Cl.
CPC ...... *B60R 13/0212* (2013.01); *B60R 13/0231* (2013.01)

(58) Field of Classification Search
CPC ................. Y10T 403/73; Y10T 403/71; Y10T 403/7176; Y10T 403/7188; Y10T 403/7129; B60R 13/0206; B60R 13/0212; B60R 13/0231; B60R 13/0218; B60R 13/0235; B60R 13/0225
USPC .................. 296/214; 403/384, 389, 391, 397
See application file for complete search history.

(56) References Cited

U.S. PATENT DOCUMENTS

| | | | | |
|---|---|---|---|---|
| 3,953,067 A | * | 4/1976 | Isola | B60R 13/0206 296/214 |
| 4,617,775 A | * | 10/1986 | Padrun | E04C 5/163 24/545 |
| 4,900,184 A | * | 2/1990 | Cleveland | E04C 5/168 24/339 |
| 6,691,382 B1 | * | 2/2004 | Su | B65D 7/20 24/335 |
| 2009/0045237 A1 | * | 2/2009 | Kunz | B60R 11/00 224/581 |

FOREIGN PATENT DOCUMENTS

JP  6062285 B2  1/2017

* cited by examiner

*Primary Examiner* — Dennis H Pedder
(74) *Attorney, Agent, or Firm* — Jonathan Pierce; Pierre Campanac; Porter Hedges LLP (57) ABSTRACT

A ceiling material for a vehicle includes a ceiling interior material facing a vehicle cabin inner surface of a roof panel for a vehicle, and a reinforcement member arranged on an upper surface of the ceiling interior material on the side of the roof panel. The reinforcement member may include a rod-like member and supporting members for respectively supporting at least two sections in a slidable manner in a longitudinal direction of the rod-like member. Each of the supporting members includes a fitting portion which allows the rod-like member to be fitted from a radial direction.

16 Claims, 6 Drawing Sheets

CEILING MATERIAL FOR VEHICLE

CROSS-REFERENCE TO RELATED APPLICATIONS

This application claims priority to Japanese patent application serial number 2018-119721 filed Jun. 25, 2018, the contents of which are incorporated herein by reference in their entirety for all purposes.

FIELD OF INVENTION

The present invention relates to the field of a ceiling material for a vehicle. More specifically, the ceiling material comprising one or more reinforcement member.

BACKGROUND

Conventionally, a ceiling material for a vehicle was made of a material with low basis weight to satisfy desired weight-reduction, etc., while maintaining the minimum stiffness required for mounting the ceiling material to a roof panel. When the ceiling material lacks stiffness, the ceiling material could be bent and broken or wrinkled. For example, damage may occur when the ceiling material is transported alone or when transported with various vehicle accessories provisionally mounted to the ceiling material. Additionally, damage may occur when the ceiling material for the vehicle is transported to the roof panel to mount the ceiling material on the roof panel. The likelihood of the roofing material being damaged is increased at portions where a cross-sectional secondary moment of the ceiling material for the vehicle is low, for example around an air outlet for an air-conditioning facility, around an opening(s) for a sunroof (s), and around an opening(s) associated with various sorts of accessories.

One possible solution to avoid damaging the ceiling material during transportation includes providing the ceiling material with reinforcement members to compensate for a lack of stiffness (see Japanese Patent No. 6062285). More specifically, the reinforcement members may be rod-like members made of an extruded synthetic resin. The rod-like members may be slid into supporting members from a longitudinal direction and slidably engage with supporting members so as to be indirectly attached to a ceiling interior material. In this way, it is possible to prevent deformation of the ceiling material due to the thermal expansion difference between the vehicle ceiling material and reinforcement members, and to provide versatile components which may be used among various different types of vehicles.

However, the rod-like members must be slid in a longitudinal direction when being mounted to the supporting members. Therefore, it is not easy to mount the rod-like members to the supporting members. Although these rod-like members and supporting members can be applied to different types of vehicles, the supporting members and the rod-like members require a specific and similar shape to be engaged with each other. For this reason, the rod-like member must be made of, for example, an extruded product, which are more difficult to manufacture. Additionally, since the rod-like member needs to be slid into the supporting member from a longitudinal direction, it is more difficult to mount the rod-like member, especially when taking into consider.

SUMMARY

According to one aspect of the present disclosure, a ceiling material for a vehicle comprises a ceiling interior material and a reinforcement member arranged on a surface of the ceiling interior material. The reinforcement member comprises a rod-like member and a plurality of supporting members structured to slidably support the rod-like member. The supporting members comprise a fitting portion structured to receive the rod-like member in a radial direction of the rod-like member.

According to one aspect of the present disclosure, a reinforcement member for a vehicle ceiling comprises a rod-like member and a plurality of supporting members, each of which have a fitting portion structured to receive the rod-like member from a radial direction.

DETAILED DESCRIPTION

Figure 1:
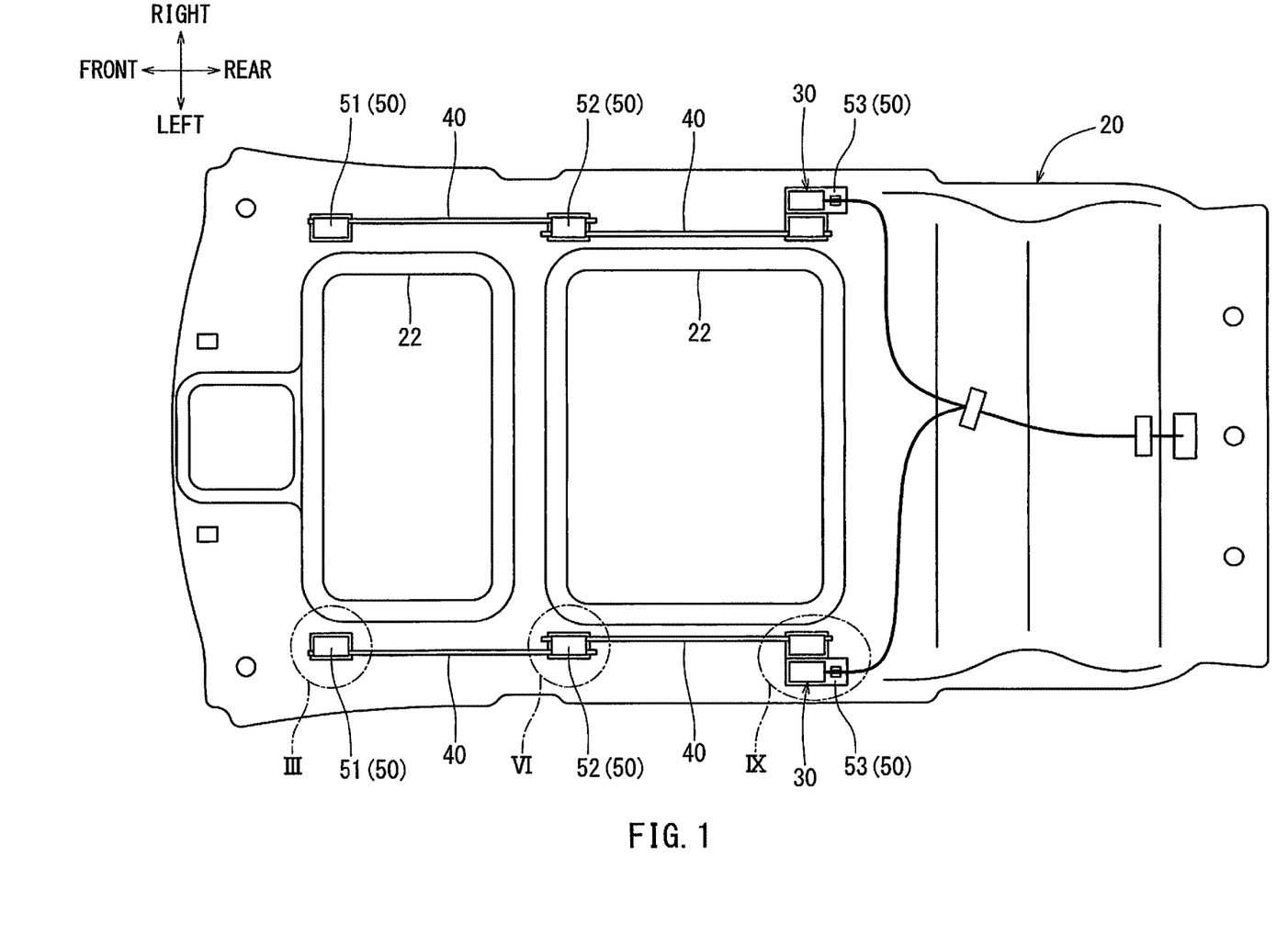
FIG. 1 is a plan view of a ceiling material for a vehicle.
Figure 2:
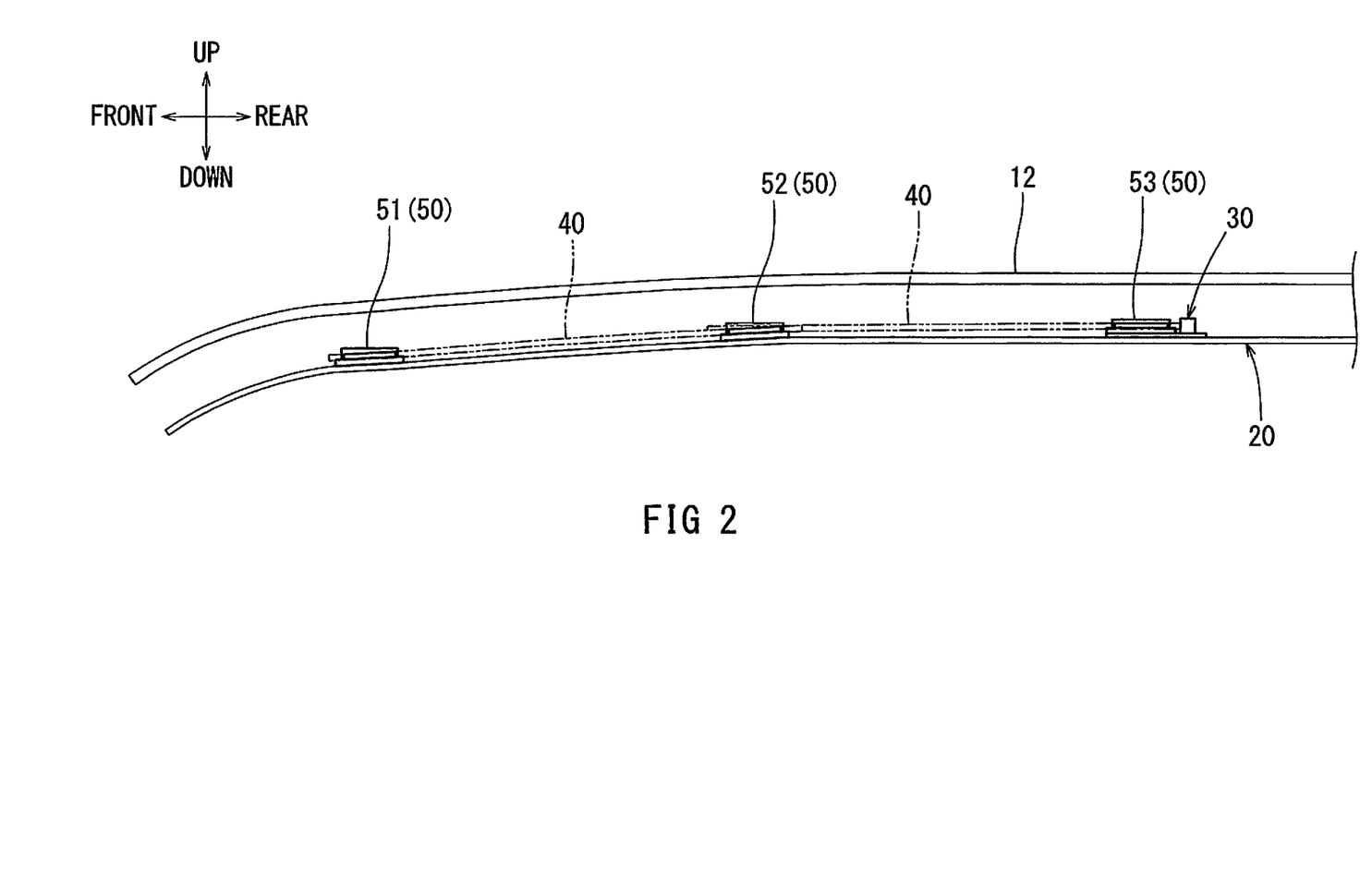
FIG. 2 is a partially exploded side view of a roof panel and the ceiling material of the vehicle.

Hereinafter, a first embodiment for carrying out the present disclosure will be described with reference to FIGS. 1 to 10. An up-down direction and a left-right direction shown in each drawing respectively correspond to an up-down direction, a left-right direction, a front-back direction with reference to a vehicle. As illustrated in FIGS. 1 and 2, a ceiling material for a vehicle according to the first embodiment includes a roof panel 12 of a vehicle, a ceiling interior material 20, and reinforcement members 30. The ceiling interior material 20 is mounted on the roof panel 12 to face a vehicle cabin interior. The ceiling interior material 20 has an upper surface facing the roof panel 12 and a lower surface facing the vehicle cabin interior. The reinforcement members 30 are arranged along the upper surface of the ceiling interior material 20.

The vehicle includes the roof panel 12 made of a steel plate as a roof illustrated in FIGS. 1 and 2. The roof panel 12 includes a lower surface facing to the vehicle cabin interior. The ceiling interior material 20 is attached to the lower surface of the roof panel 12. An opening (such as an opening 22 illustrated in FIG. 1) for a sunroof may be formed in the roof panel 12.

As illustrated in FIGS. 1 and 2, the ceiling interior material 20 has a surface shape and an outer shape corresponding to the lower surface (a vehicle cabin side surface) of the roof-panel 12 of the vehicle. Conventional various types of materials can be employed for a basic constitution of the ceiling interior material 20. For example, the ceiling interior material 20 may include a base member and a surface skin laminated with each other. The ceiling interior material 20 may be produced by, for example, a hot press process, a cold press process, or any other suitable process.

The base member may mainly include a core member responsible for maintaining the shape of the ceiling interior material 20, ensuring stiffness, absorbing noise in the vehicle cabin, and/or insulating heat, or the like. The core member is provided for maintaining shape and ensuring stiffness, but may also be provided for absorbing noise and insulating heat in the vehicle cabin. The core member may be formed of various materials such as a fiber based material, a carton based material, a urethane based material, a foamed olefin based material, or any other suitable material. A urethane foam with a semi-hard layer made of an urethane resin foam is adopted as the core member according to the present embodiment. A fiber reinforced material applied and impregnated with a thermosetting adhesive may be laminated on both sides of the core member to improve stiffness. A lining material made of an air-impermeable film or a thermoplastic synthetic fiber nonwoven fabric may be laminated on the surface of the fiber reinforced material.

A surface skin may be responsible for a design aspect of the ceiling interior material 20. The surface skin includes a laminated surface layer and urethane foam sheet or the like. The surface layer may be made of a material such as fabric, cloth, knit, woven fabric, nonwoven fabric, raised fabric, synthetic leather, artificial leather, genuine leather, or any other suitable material. The urethane foam sheet may have a soft layer made of urethane resin foam to achieve a soft touch feeling on the ceiling interior material 20. The surface skin may or may not include a urethane foam sheet.

Various accessories such as interior lights, an air outlet for an air-conditioning facility, sun visors, assist grips, etc. may be mounted to the roof panel 12 for a vehicle through the ceiling interior material 20. Due to this configuration, a plurality of through holes corresponding to each attachment portion of the accessories may be formed in the ceiling interior material 20. Attachment holes (not shown) respectively corresponding to the holes in the ceiling interior material 20 are formed in the roof panel 12. The accessories for a vehicle are inserted in the holes of the ceiling interior material 20 and mounted in the respective attachment holes formed in the roof panel 12 with bolts, nuts, screws, and/or clips, etc.

The ceiling interior material 20 may be made of a material having low basis weight to comply with weight-reduction requirements, wherein the material has such a degree of basis weight that prevents the ceiling interior material 20 from being excessively bent when the ceiling interior material 20 is mounted to the roof panel 12. Openings 22 extending through the thickness direction (e.g., up-down direction) are formed at the center of the ceiling interior material 20. An area of the ceiling interior material 20 around the openings 22 is small and the cross-sectional secondary moment around the openings 22 is low. The ceiling interior material 20 may be bent, broken, or wrinkled at the portions where the cross-sectional secondary moment is low. For example, it may be wrinkled when the ceiling interior material 20 is transported alone or when transported with various accessories attached to the ceiling interior material 20 in a provisionally mounted state. The ceiling interior material 20 may also be damaged when the ceiling interior material 20 is mounted to the roof panel. 12. Accordingly, reinforcement members 30 may be provided on the ceiling interior material 20 to compensate for the stiffness of the roof panel 12.

FIGS. 1 and 2 depict an embodiment of the reinforcement members 30 arranged along the upper surface of the ceiling interior material 20, so as to be facing to the roof panel 12. The reinforcement members 30 may be arranged along sides of the openings 22, where the ceiling interior material 20 may be weaker. Each reinforcement member 30 includes rod-like members (rods) 40 and supporting members 50. Each rod-like member 40 may have a straight, long shape. Each supporting member 50 has an engagement portion into which a part of the rod-like member 40 is slidably engaged in the longitudinal (e.g., front-rear) direction. The supporting member 50 is attached to the ceiling interior material 20 and supports the rod-like member 40.

In some embodiments, the rod-like member 40 is straight and has a uniform cross-sectional shape along its longitudinal direction. A metal hollow pipe may be employed for the rod-like member 40 according to the present embodiment. Alternatively, the rod-like member 40 may be a solid member and/or made of a different material. The rod-like member 40 may be made of various metals such as aluminum alloy and/or stainless steel. The rod-like member 40 may be formed by extrusion molding or tube drawing method, for example. Synthetic resin can also be adopted for the rod-like member 40, for example a thermoplastic member such as polypropylene resin, polyethylene resin, acrylonitrile butadiene styrene (ABS) resin may be adopted. In order to improve the stiffness, a material obtained by mixing a fiber reinforced material with the synthetic resin may be adopted to the rod-like member 40. The fiber reinforced material may be made of inorganic fibers such as glass fibers or organic fibers such as natural fibers, for example, jute, kenaf, ramie, hemp, sisal hemp, or bamboo. The rod-like member 40 may alternatively be formed of a composite of materials, such as a composite of synthetic resin and metal.

The supporting members 50 may be made of synthetic resin, or any other suitable material, and may be formed, for example, by injection molding or other suitable process. The supporting members 50 may be made of an appropriate synthetic resin, for example, a thermoplastic member such as polypropylene resin, polyethylene resin or acrylonitrile-butadiene-styrene (ABS) resin. In order to improve stiffness, the supporting members 50 may be made of a material obtained by mixing a fiber reinforcement material with the synthetic resin. For example, inorganic fibers such as glass fibers, natural fibers such as bamboo or organic fibers can be appropriately selected for a fiber reinforced material. Organic fibers may be, for example, jute, kenaf, ramie, hemp, or sisal hemp.

As illustrated in FIGS. 1 and 2, the supporting members 50 are provided at least at two locations in the longitudinal direction of the rod-like member 40 and are structured to slidably support the rod-like members 40. According to the present embodiment, the supporting members 50 include a first supporting member 51, a second supporting member 52, and a third supporting member 53. The first supporting member 51 is arranged at a front region of the ceiling interior material 20. The third supporting member 53 is arranged at a rear region of the ceiling interior material 20. The second supporting member 53 is arranged at a region of the ceiling material 20 between the front region and rear region.

As illustrated in FIGS. 3 to 10, each supporting member 50 may include a fitting portion 54 for supporting the rod-like member 40, a joining portion 55 structured to be joined to the ceiling interior material 20, and a coupling portion 56 structured to be coupled to the roof panel 12. The joining portion 55 may be flat along a surface facing the ceiling interior material 20. The joining portion 55 may be fixed to the ceiling interior material 20 with a hot-melt adhesive material or with fastening members such as screws, bolts, nuts, or with clips. The coupling portions 56 are structured so at to attach to the roof panel 12, thereby mounting the ceiling interior material 20 to the roof panel 12. The coupling portions 56 may have a flat surface to face a mounting surface (not shown) of the roof panel 12. For example, a hook-and-loop fastener may be employed for the coupling portions 56.

Figure 3:
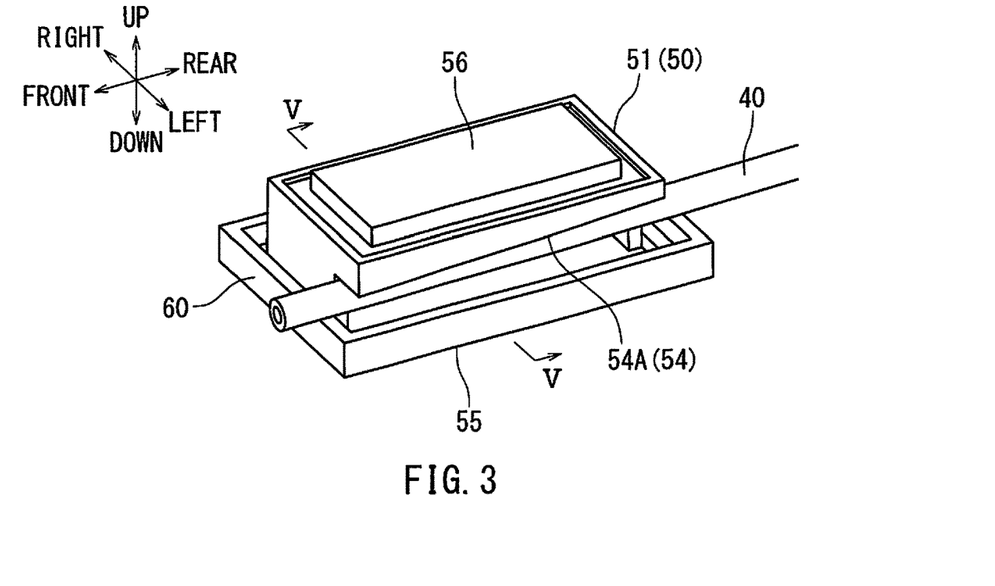
FIG. 3 is an enlarged perspective view of section III of FIG. 1.
Figure 7:
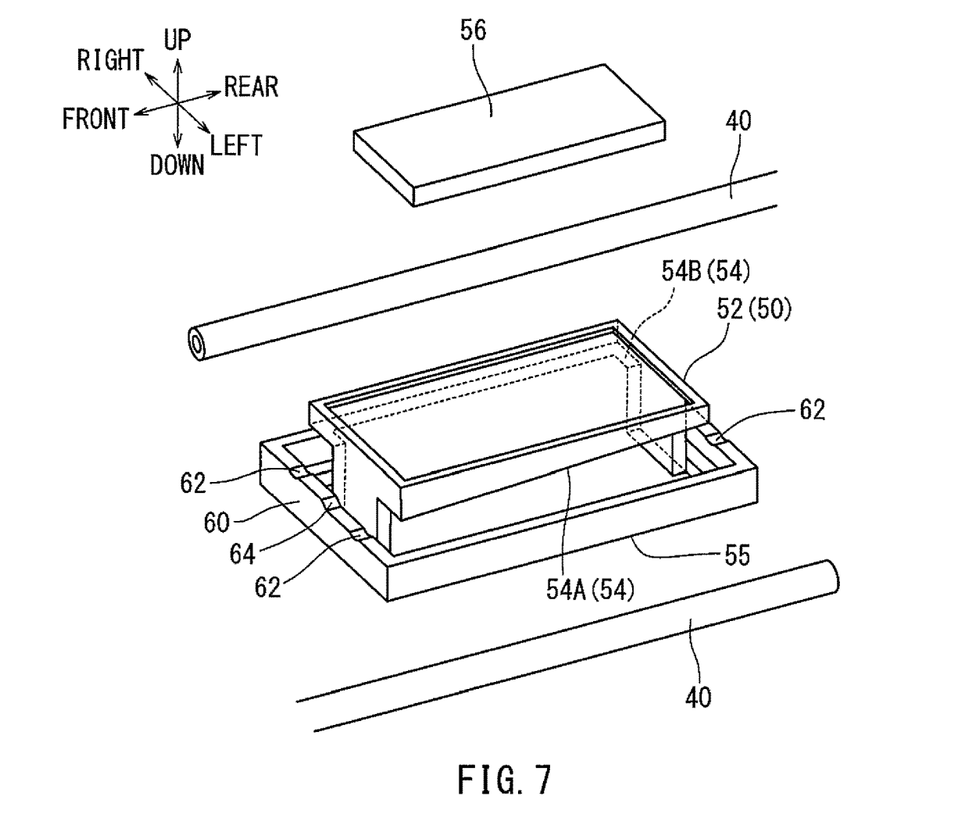
FIG. 7 is an exploded perspective view of the reinforcement member shown in FIG. 6.
Figure 8:
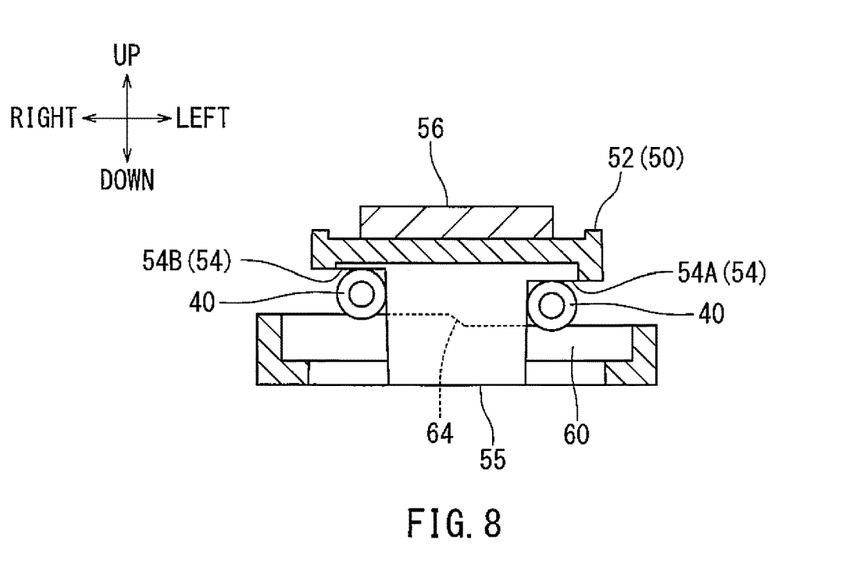
FIG. 8 is a cross-sectional view taken along line VIII-VIII in FIG. 6.

As depicted in FIG. 3, the fitting portion 54 is configured to allow the rod-like member 40 to be fitted from the radial (e.g., left-right) direction to support the rod-like member 40. The fitting portion 54 clamps the rod-like member 40 such that a first fitting surface of the fitting portion 54 on the side of the joining portion 55 and a second fitting surface of the fitting portion 54 on the side of the coupling portion 56 cooperatively clamp the rod-like member 40. The second fitting surface of the fitting portion 54 may be positioned in at least a portion of the side wall 60. The fitting portion 54 may include an inclined fitting portion 54A, which is inclined in a thickness (e.g., up-down) direction of the ceiling interior material 20 and fitted with the rod-like member 40. Alternatively or additionally, as illustrated in FIGS. 7 and 8, the fitting portion 54 may include a parallel fitting portion 54B, which extends parallel in a direction along the ceiling interior material 20 and is fitted with the rod-like member 40.

In some embodiments, the inclined fitting portion 54A may be structured so as to position the rod-like member 40 to be inclined with respect to a major surface of the supporting member 50. For example, the rod-like member 40 may be inclined so as to match the slope of the inclined fitting portion 54A. With such a positioning, the rod-like member 40 may be positioned so as to be inclined (e.g. in an up-down direction) with respect to an uppermost surface of the supporting member 50, for example the surface corresponding to the coupling portion 56.

In some embodiments, the parallel fitting portion 54B may be structured so as to position the rod-like member 40 to be parallel with respect to a major surface of the supporting member 50. For example, the rod-like member 40 may be positioned to be parallel so as to match the slope of the parallel fitting portion 54B. With such a positioning, the rod-like member 40 may be positioned so as to be parallel (e.g. in an up-down direction) with respect to an uppermost surface of the supporting member 50, for example the surface corresponding to the coupling portion 56.

Figure 4:
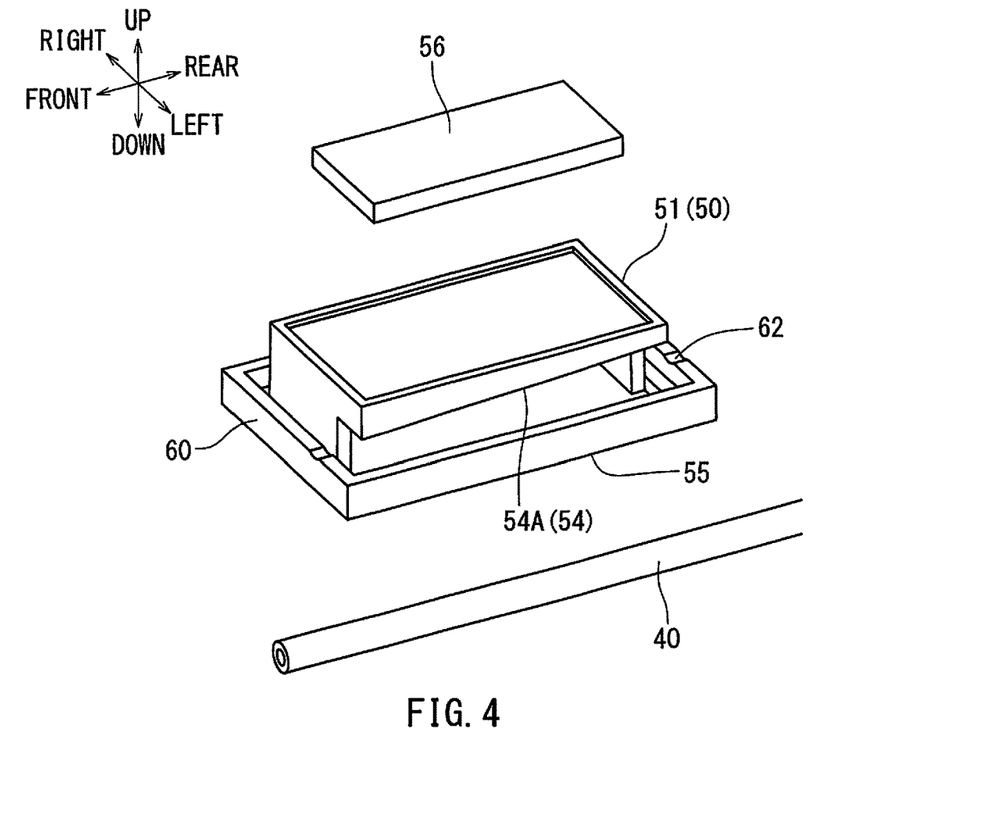
FIG. 4 is an exploded perspective view of the reinforcement member shown in FIG. 3.
Figure 5:
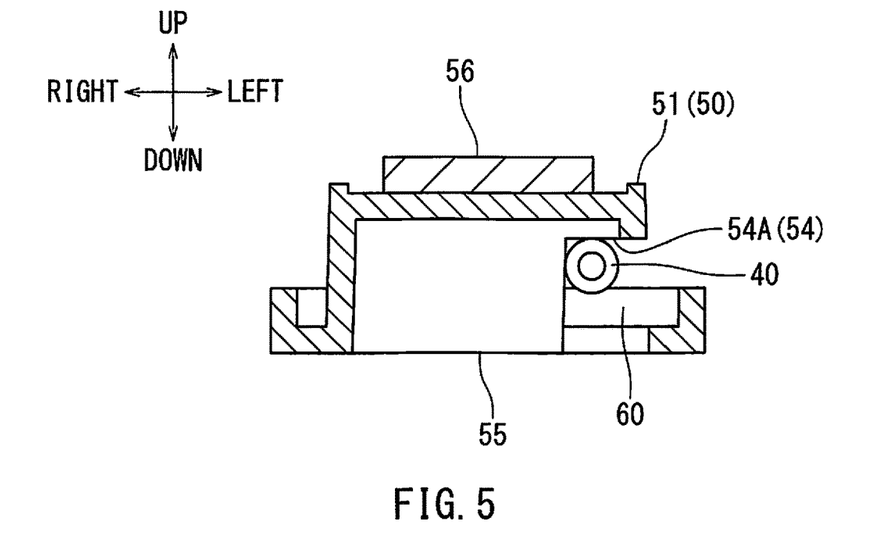
FIG. 5 is a cross-sectional view take along line V-V in FIG. 3.
Figure 6:
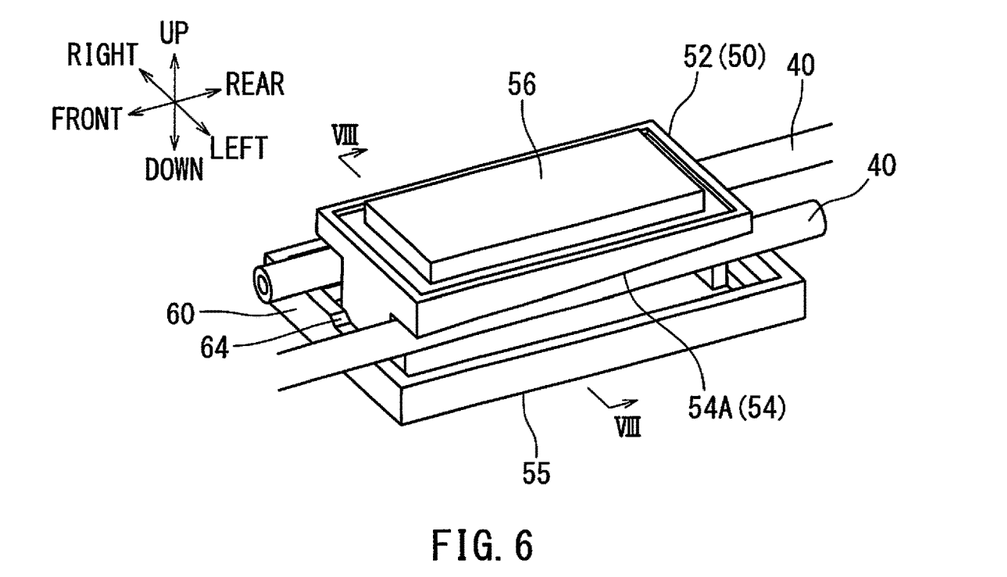
FIG. 6 is an enlarged perspective view of section VI of FIG. 1.
Figure 9:
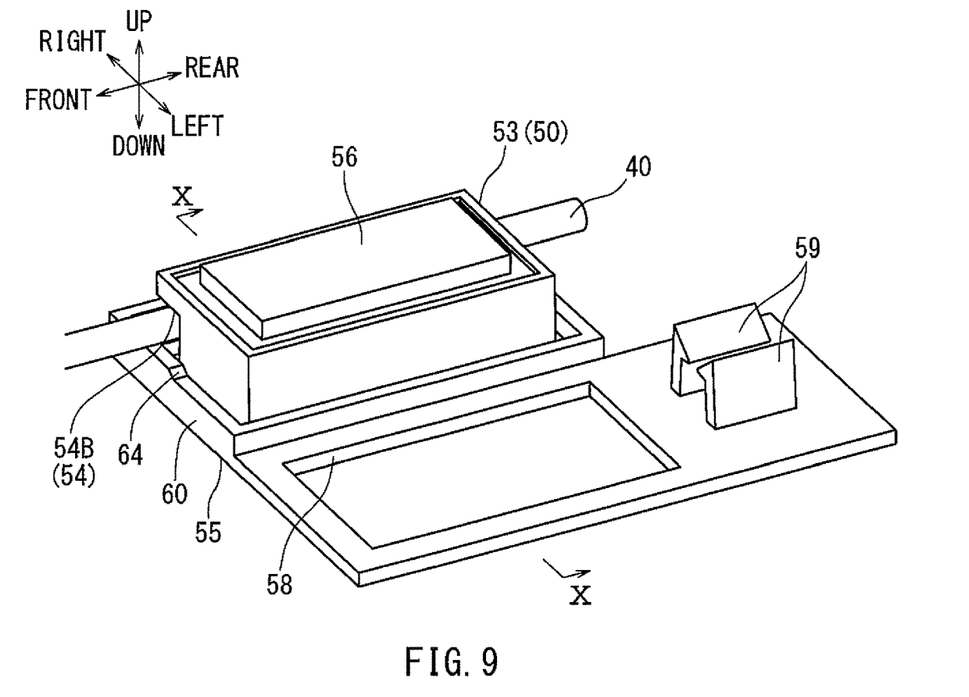
FIG. 9 is an enlarged perspective view of section IX of FIG. 1.
Figure 10:
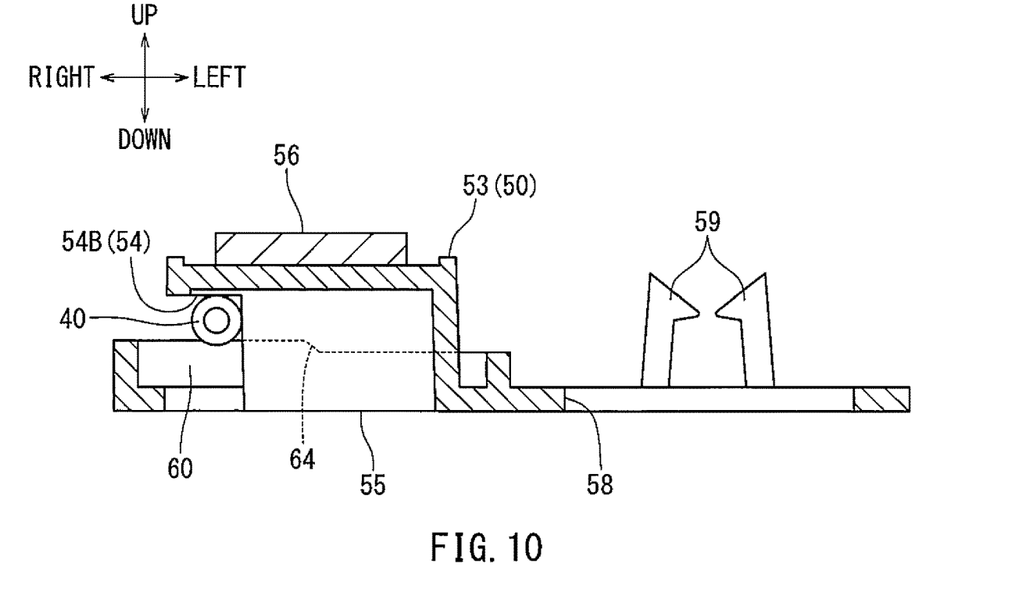
FIG. 10 is a cross-sectional view taken along line X-X in FIG. 9.

As illustrated in FIGS. 3 to 5, the first supporting member 51 includes an inclined fitting portion 54A. As illustrated in FIGS. 6 to 8, the second supporting member 52 includes both an inclined fitting portion 54A and a parallel fitting portion 54B. As illustrated in FIGS. 9 and 10, the third supporting member 53 includes a parallel fitting portion 54B. The supporting member 50 may be integrally provided with an accessory or accessories for the ceiling interior material 20, such as an interior light and an air outlet(s) for an air-conditioning facility. For example, the third supporting member 53 may be integrally formed with a fitting portion 54, an opening for accessory 58, and a wire harness locking portion 59.

One of the benefits of forming the accessory opening 58 directly within the supporting member 50 is that it allows the ceiling interior material 20 to have its structure reinforced at an area of potential weakness. More specifically, the area surrounding an opening in the ceiling interior material 20, for example in an opening for a vehicle accessory such as an interior light or an air vent, may have a decreased structural integrity. As this area of weakness is supported by the supporting member 50 with an accessory opening 58, damage to the ceiling interior material 20 may be reduced.

In some embodiments, the supporting members 50 may further include one or more side wall 60. The side walls 60 may be structured so as to have one or more indent 62 positioned within the side wall 60. For example, an indent 62 may be positioned in an upper surface of the side wall 60 at or near the fitting portion 54. By positioning the indent 62 at or near the fitting portion 54, the rod-like member 40 may be slidably secured to the supporting member 50.

More specifically, the rod-like member 40 may be inserted into the fitting portion 54 from the radial (e.g., left-right) direction. The rod-like member 40 may be inserted to such a point that the rod-like member 40 engages with the indent 62 of the side wall 60. As the indent 62 allows less clamping pressure to be exerted in the up-down direction, as compared when the rod is positioned along other portions of the side wall 60 in the area of the fitting portion 54, the rod-like member 40 may more easily slide in a direction perpendicular (e.g., front-rear) to the radial (e.g. left-right) direction from which the rod-like member 40 was inserted into the fitting portion 54. However, since the side wall 60 is effectively raised towards the opening of the fitting portion 54, as compared to the indent 62, the rod-like member 40 may not easily disengage from the fitting portion 54 in a radial direction. Accordingly, the rod-like member 40 may be slidably engaged with the supporting member 50 in a longitudinal direction while still being secured in a radial direction.

In some embodiments, the indent 62 may be aligned with the upper surface of the fitting portion 54. For example, the indent 62 at or near an inclined fitting portion 54A may also be inclined by approximately the same slope as the inclined fitting portion 54A. However, the indent 62 at or near a parallel fitting portion 54B may also have a parallel alignment. With such an alignment, the indent 62 may exert less pressure on the rod-like member 40 so as to better allow the rod-like member 40 to slide within the indent and fitting portion 54 in the longitudinal (e.g., front-rear) direction.

In some embodiments, the sloping angle of the indent 62 may match the sloping angle of an indent 62 in an adjacent supporting member 50. For example, the sloping angle of the indent 62 of the first supporting member 51 may be similar to the sloping angle of the indent 62 of the second supporting member 52. More specifically, the sloping angles of the indents 62 corresponding to the same rod-like member 40 may be similar.

In some embodiments, the side wall 60 may have a differing height in the radial (e.g., left-right) direction and/or may have a differing height from another side wall 60 in a direction perpendicular (e.g., front-rear) to the radial direction. For example, the height of the side wall 60 corresponding to the lower portion of the inclined fitting portion 54A of the second supporting member 52 may be smaller than the height of the same side wall 60 at a portion corresponding to the parallel fitting portion 54B. There may also be a transition between these different heights, for example at sloping portion 64. As another example, the height of the side wall corresponding to a lower portion of the inclined fitting portion 54A of the first supporting member 51 may be smaller than the height of the opposite side wall 60 at a portion corresponding to an upper portion of the inclined fitting portion 54A of the first supporting member 51. The differing side wall 60 heights allow for the height between the lower surface of the indent 62 and the upper surface of the fitting portion 54 to be similar. Accordingly the clamping strength of the supporting member 50 on the rod-like member 40 may be similar. This allows the rod-like member 40 to more predictably slide in a direction perpendicular (e.g., front-rear) to the radial (e.g., left-right) direction.

In some embodiments, a portion of the thickness (in the up-down direction) of the upper surface of the supporting member 50 may differ. For example, an upper surface of the supporting member 50 in an area corresponding to an inclined fitting portion 54A may have a tapered thickness in a thickness (e.g., up-down) direction along a longitudinal (e.g., front-rear) direction. However, the upper surface of the supporting member 50 may have a consistent thickness in the longitudinal direction in an area corresponding to a parallel fitting portion 54B. By structuring the thickness of the upper surface of the supporting member 50 in such a fashion, the uppermost surface of the supporting member 50 may be flat and parallel to the lowermost surface of the supporting member 50.

The rod-like member 40 of the reinforcement member 30 may be formed by one member in a longitudinal direction or may be formed by a plurality of pieces in the longitudinal direction wherein the plurality of pieces are connected via one or more supporting member 50. Each of the reinforcement members 30 may be positioned towards a right side or left side of the ceiling interior material 20 and may be aligned in a front-rear direction. As illustrated by the virtual lines in FIG. 2, front and rear portions of the reinforcement member 30 vertically intersect or overlapped and may extend essentially in parallel to each other when viewed from the side of the ceiling interior material 20. With this configuration, the shape of the rod-like member 40 can be adapt to variations in shape of the ceiling interior material 20 in the thickness (e.g., up-down) direction by adjusting positions and inclination angles of the front and rear portions or pieces of the rod-like member 40. Referring to FIG. 1, the front and rear pieces of the reinforcement member 30 laterally intersect or overlapped and extend in parallel to each other in a plan view of the ceiling interior material 20. Therefore, the reinforcement members 30 can be arranged in favorable locations in accordance with the stiffness distribution in the ceiling interior material 20.

A ceiling material for a vehicle may be configured as described above. More specifically, the reinforcement member 30 includes the rod-like member 40, and the supporting members 50 configured to slidably support the rod-like member 40 at least at two locations in the longitudinal direction. The reinforcement members 30 may serve to prevent wrinkling or distortion on a surface skin resulting from deformation of the ceiling interior material 20 due to warping or the like caused by differences in thermal expansion of the various materials being used.

In some embodiments, the supporting members 50 may be positioned at or near at least one corner of the opening 22. For example, the first supporting member 51 may be positioned at or near a front corner of the front opening 22, the second supporting member 52 may be positioned at or near a front corner of a rear opening 22, and the third supporting member 53 may be positioned at or near a rear corner of a rear opening 22. In some embodiments, this positioning is preferable as it places structural supports that may be directly attached to the ceiling interior material 20 at locations that may be prone to weakness. More specifically, the areas around the opening 22 of the ceiling interior material 20, which may be associated with a sunroof in a finished vehicle, may be a location of structural weakness. Additionally, the ceiling interior material 20 may be weaker around the opening 22 because the ceiling interior material 20 is thinner at this location. For example, the ceiling interior material 20 to the left and right of the opening 22 may be thinner due to the opening 22. By positioning the supporting members 50 at or near a corner of the opening 22 and positioning the rod-like members 40 between the supporting members 50, the structural weakness at various locations of the ceiling interior material 20 may be mitigated. However, since the rod-like members 40 are slidably engaged with the supporting members 50, damage resulting from changes due to differing thermal expansions may also be mitigated.

Each of the supporting members 50 may include the fitting portion 54 which allows the rod-like member 40 to be fitted from a radial direction so as to be supported. With this configuration, the rod-like member 40 can be more easily attached to the supporting members 50 as compared with the conventional configuration in which a rod-like member must be attached to supporting members by sliding the rod-like member from a longitudinal direction with respect to the supporting members. Additionally, the present fitting portion 54 can easily receive rod-like members 40 having various cross-sectional shapes, since the rod-like member 40 is fitted from the radial direction. Consequently, the supporting members 50 can be applied to various shaped rod-like members 40, thereby achieving high versatility. In addition, the rod-like member 40 can be easily attached to the supporting members 50, since it can be fitted from the radial direction, rather than the longitudinal direction.

The straight rod-like member 40 of the reinforcement member 30 may be arranged with an inclination in the thickness (e.g., up-down) direction of the ceiling interior material 20. In this way, it is possible to configure the shape of the rod-like member 40 even if the shape of the ceiling interior material 20 is varied or inclined in the up-down direction.

The rod-like member 40 may include a plurality of pieces which are arranged essentially in the longitudinal direction. In other words, the rod-like member 40 may be divided into a plurality of pieces. The plurality of pieces may be arranged such that at least some parts extend in parallel to each other in a side view or a plan view of the ceiling interior material 20. With this configuration, the reinforcement member 30 can be installed such that it is favorably adapted to the shape of the ceiling interior material 20, even if the shape of the ceiling interior material 20 is three-dimensionally complex.

The supporting members 30 may be structured so as to integrally allow for an accessory, which is to be provided through the ceiling interior material 20. With this configuration, the number of components of the vehicle ceiling material can be reduced.

The vehicle ceiling material has a favorable structure for a vehicle having an opening(s) for a sunroof(s). The ceiling material according to the present embodiments can also be adapted for the ceiling material without an opening for a sunroof.

The above described embodiment(s) have at least the benefit that when the ceiling interior material 20 deforms due to warping or the like caused by the influence such as heat, the rod-like member 40 may slide in a longitudinal direction with respect to the supporting members 50. This may prevent wrinkling or distortion on a skin resulting from deformation of the ceiling interior material 20. Additionally, the fitting portion 54 is structured to allow the rod-like member 40 to be fitted from a radial direction. With this configuration, the rod-like member 40 can be more easily attached to the supporting member 50, as compared with the conventional configuration in which the rod-like member is attached to the supporting member by slidably moving the rod-like member into the supporting member from a longitudinal direction. Further, the fitting portion 54 can easily receive the rod-like member 40 having various cross-sectional shapes since the rod-like member 40 is fitted from the radial direction. Consequently, rod-like members 40 having various cross-sectional shapes can be adopted, thus achieving high versatility.

As discussed above, the rod-like member 40 may be configured to have a straight shape, while the supporting member 50 may be arranged such that the rod-like member 40 is inclined with respect to the ceiling interior material 20 in a thickness direction. With this configuration, the shape of the reinforcement member 30 may favorably adapt to the shape of the ceiling interior material 20 when shape of the ceiling interior material 20 varies in the thickness direction.

As mentioned above, the rod-like member 40 may comprise a plurality of pieces that are arranged in essentially the longitudinal direction such that some parts intersect or extend in parallel to each other in a side view or a plan view of the ceiling interior material 20. With this configuration, the reinforcement member 30 can be arranged such that it favorably adapts to the shape of the ceiling interior material 20, even if the shape of the ceiling interior material 20 is three-dimensionally complex.

As discussed above, the supporting members 50 may integrally have an accessory which is provided on the ceiling interior material 20. With this configuration, the number of components of the reinforcement member 30 can be reduced.

As mentioned above, the ceiling interior material 20 may include an opening(s) 22 extending through its thickness direction. The reinforcement member 30 may be arranged around the opening(s) 22. With this configuration, the periphery around the opening of the ceiling interior material 20, which has a lower stiffness, is reinforced by the reinforcement member 30.

The various examples described above in detail with reference to the attached drawings are intended to be representative of the present disclosure and are thus non-limiting embodiments. The detailed description is intended to teach a person of skill in the art to make, use, and/or practice various aspects of the present teachings and thus does not limit the scope of the disclosure in any manner. Furthermore, each of the additional features and teachings disclosed above may be applied and/or used separately or with other features and teachings in any combination thereof, to provide improved ceiling materials for vehicles, and/or methods of making and using the same.

What is claimed is:

1. A ceiling material for a vehicle, comprising:
   a ceiling interior material; and
   a reinforcement member arranged on a surface of the ceiling interior material, wherein the reinforcement member comprises a rod-like member and a plurality of supporting members structured to slidably support the rod-like member, and wherein the plurality of supporting members comprise a fitting portion structured to receive the rod-like member in a radial direction of the rod-like member,
   wherein the plurality of supporting members are integrally configured with one or more vehicle accessory.

2. The ceiling material for a vehicle according to claim 1, wherein the rod-like member is configured to have a straight shape, and at least one of the plurality of supporting members is structured to support the rod-like member in an inclined state in a thickness direction with respect to the ceiling interior material.

3. The ceiling material for a vehicle according to claim 1, wherein the rod-like member comprises a plurality of divided pieces divided in a longitudinal direction of the rod-like member, and wherein the plurality of divided pieces are arranged such that the divided pieces intersect in a side view and/or extend in parallel in a plan view of the ceiling interior.

4. The ceiling material for a vehicle according to claim 1, wherein the ceiling interior material includes an opening extending through a thickness direction of the ceiling interior material, and wherein the reinforcement member is arranged alongside the opening.

5. The ceiling material for a vehicle according to claim 1, wherein the plurality of supporting members further comprises a joining portion structured to be attached to the ceiling interior material.

6. A reinforcement member for a vehicle ceiling, comprising:
   a first rod-like member;
   a plurality of supporting members, each with a first fitting portion structured to receive the first rod-like member from a radial direction of the first rod-like member,
   wherein at least one of the plurality of supporting members further comprises a second fitting portion structured to receive a second rod-like member from a direction opposite to the radial direction of the first rod-like member,
   wherein the first fitting portion is sloped at an upper surface of the first fitting portion and the second fitting portion is not sloped at an upper surface of the second fitting portion,
   wherein at a first side of the at least one of the plurality of supporting members, an upper thickness of the at least one of the plurality of supporting members at the first fitting portion is approximately the same as an upper thickness of the at least one of the plurality of supporting members at the second fitting portion.

7. The reinforcement member for a vehicle ceiling of claim 6, wherein the first fitting portion is further structured to slidably support the first rod-like member in a direction perpendicular to the radial direction of the first rod-like member.

8. The reinforcement member for a vehicle ceiling of claim 6, wherein the first fitting portion of the at least one of the plurality of supporting members further comprises a sloped surface structured to engage a portion of the first rod-like member and to position the first rod-like member at a non-parallel angle with respect to a major surface of the at least one of the plurality of supporting members.

9. The reinforcement member for a vehicle ceiling of claim 6, wherein the second fitting portion of the at least one of the plurality of supporting members further comprises a straight surface structured to engage a portion of the second rod-like member and to position the second rod-like member parallel with respect to a major surface of the at least one of the plurality of supporting members.

10. The reinforcement member for a vehicle ceiling of claim 6, wherein at a second side of the at least one of the plurality of supporting members, an upper thickness of the at least one of the plurality of supporting members at the first fitting portion is thicker than an upper thickness of the at least one of the plurality of supporting members at the second fitting portion.

11. The reinforcement member for a vehicle ceiling of claim 6, wherein the at least one of the plurality of supporting members further comprises a first side wall with a first indent aligned with the first fitting portion.

12. The reinforcement member for a vehicle ceiling of claim 6, wherein the at least one of the plurality of supporting members further comprises a side wall structured with a first indent aligned with the first fitting portion and a second indent aligned with the second fitting portion.

13. The reinforcement member for a vehicle ceiling of claim 12, wherein the first indent and the second indent are located at different height.

14. The reinforcement member for a vehicle ceiling of claim 11, wherein the at least one of the plurality of supporting members further comprises a second side wall structured with a second indent aligned with the first fitting portion.

15. The reinforcement member for a vehicle ceiling of claim 14, wherein the indent and the second indent are located at different height.

16. The reinforcement member for a vehicle ceiling of claim 6, wherein at least one of the plurality of supporting members further comprises an aperture structured to receive a vehicle accessory.

* * * * *